(12) United States Patent
Beaumont

(10) Patent No.: US 6,883,421 B2
(45) Date of Patent: Apr. 26, 2005

(54) INSTALLATION FOR PREPARING LETTUCE HEADS

(75) Inventor: Laurent Beaumont, Coutances (FR)

(73) Assignee: Soleco, Lessay (FR)

( * ) Notice: Subject to any disclaimer, the term of this patent is extended or adjusted under 35 U.S.C. 154(b) by 8 days.

(21) Appl. No.: 10/341,955

(22) Filed: Jan. 14, 2003

(65) Prior Publication Data

US 2003/0170350 A1 Sep. 11, 2003

(30) Foreign Application Priority Data

Jan. 15, 2002 (FR) .............................. 02 00421

(51) Int. Cl.$^7$ .......................... A23N 15/04; A47J 17/00
(52) U.S. Cl. ........................... 99/539; 99/544; 83/932; 83/404; 83/368
(58) Field of Search ......................... 83/932, 404, 368; 99/539, 544

(56) References Cited

U.S. PATENT DOCUMENTS

| | | | | |
|---|---|---|---|---|
| 2,084,194 A | * | 6/1937 | Frank | .......................... 30/174 |
| 3,382,901 A | | 5/1968 | Pheterson | |
| 3,396,766 A | | 8/1968 | Perkins | |
| 4,241,096 A | | 12/1980 | Shaw | |
| 5,727,690 A | * | 3/1998 | Hofmeister | .............. 209/139.1 |
| 6,607,769 B1 | * | 8/2003 | Krymskiy et al. | .......... 426/484 |

FOREIGN PATENT DOCUMENTS

EP            0 419 349 A1      3/1991

* cited by examiner

*Primary Examiner*—Anthony Weier
(74) *Attorney, Agent, or Firm*—Baker & Daniels

(57) ABSTRACT

An apparatus for preparing lettuce heads with tightly packed overlapping leaves or vegetables with a similar structure. The apparatus includes a plurality of workstations and supports for receiving lettuce heads and for conveying the lettuce heads through the workstations. At the workstations, cutters are operably disposed for severing the bases of the outer leaves and for slicing into the tops of the outer leaves. A device, such as an air jet, is provided at one of the stations for removing the outer leaves. Additional cutters are provided at the work stations for transversely slicing the central part of the lettuce head and for severing a portion of the central part from the heart of the lettuce head. Still another cutter is disposed at one of the stations for severing pink parts from the heart. A cutter is also provided for severing the heart from the stalk. The edible parts such as the central parts and the heart are then collected in receptacles disposed at the work stations. The disposed of parts such as the stalk, outer leaves, and pink parts are collected at the work stations for disposal.

7 Claims, 2 Drawing Sheets

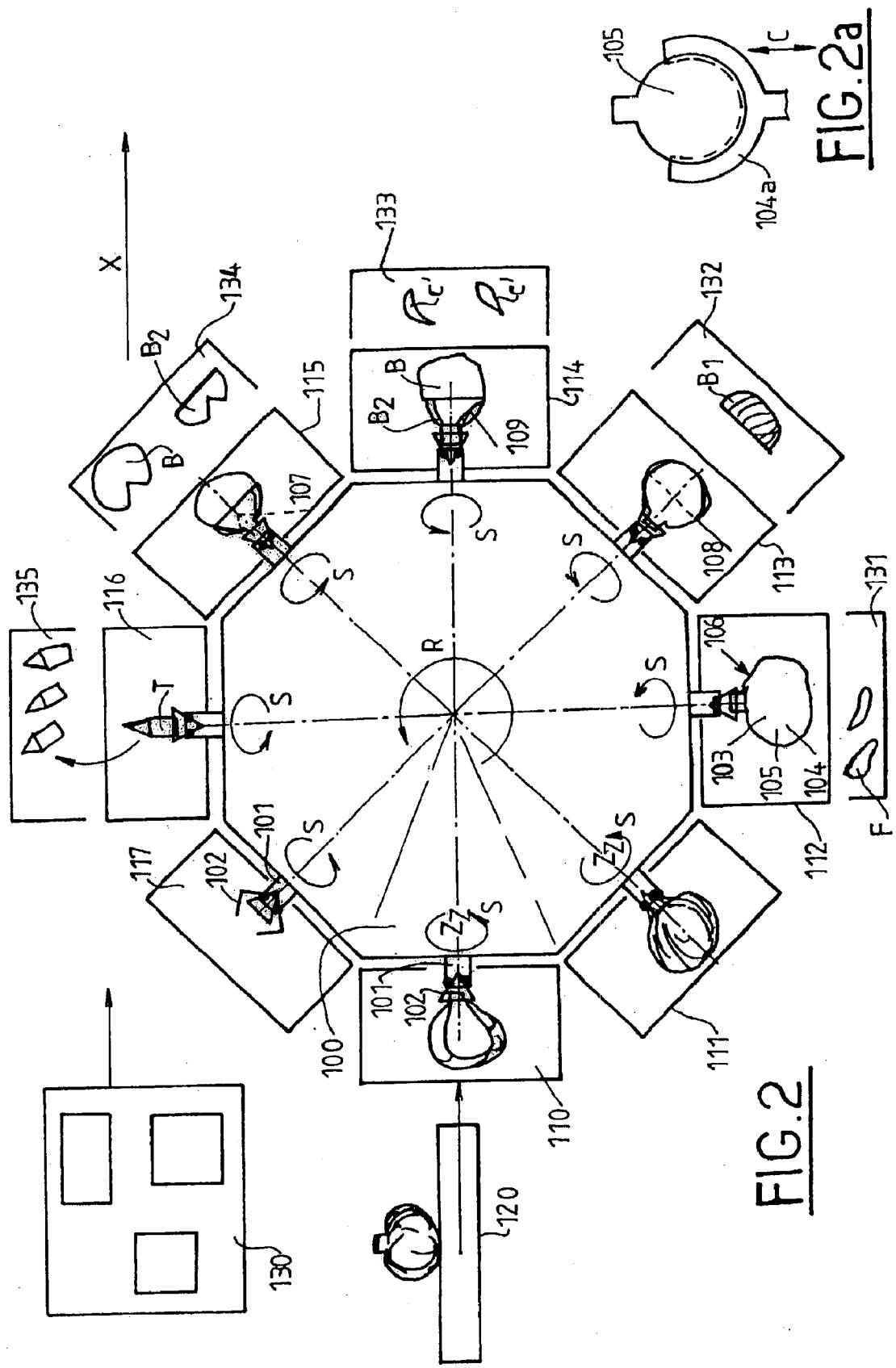

INSTALLATION FOR PREPARING LETTUCE HEADS

Figure 1:
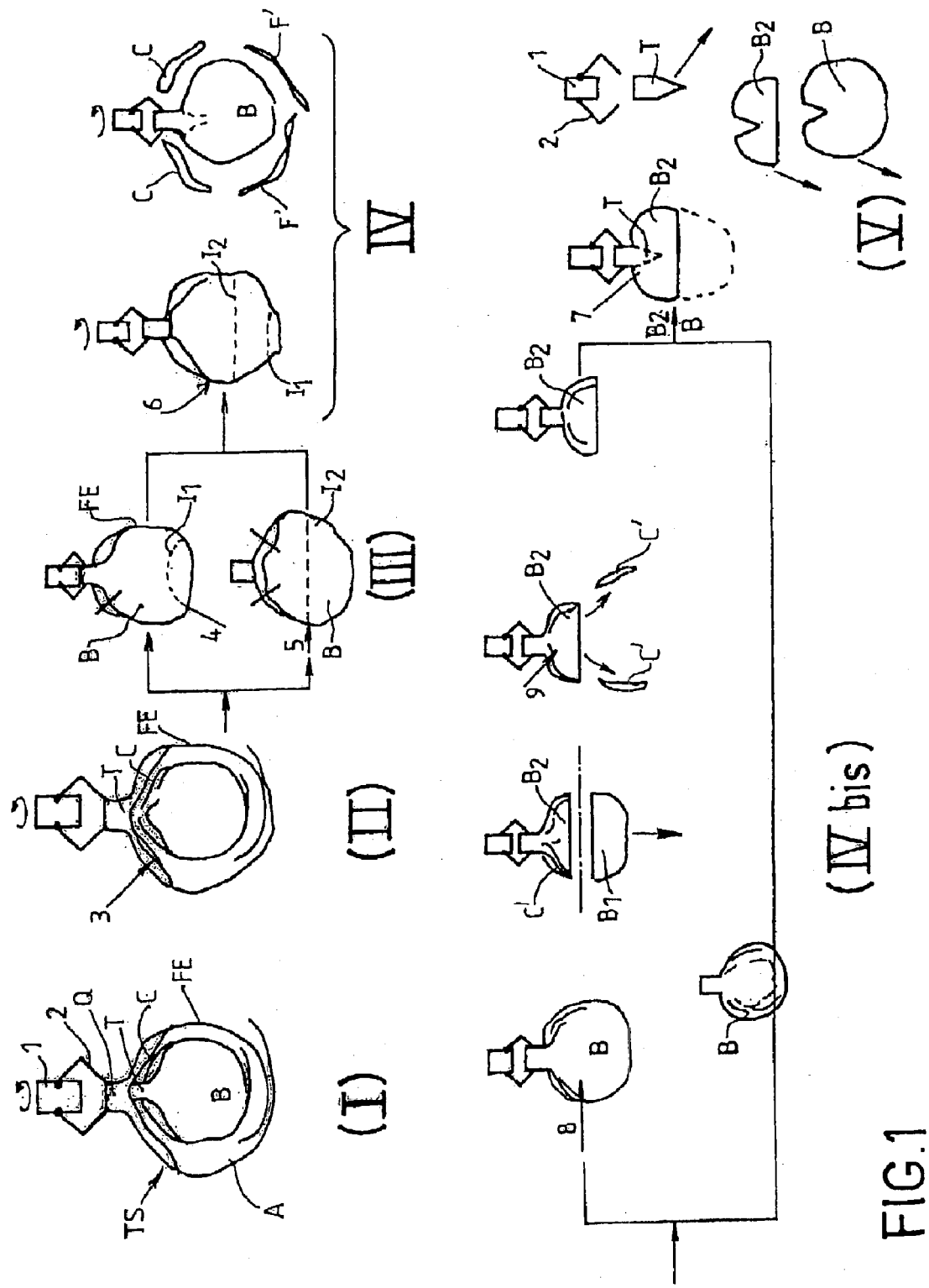

The present invention relates to a method and an installation for preparing lettuce heads with tightly packed overlapping leaves of the iceberg type or vegetables with a similar structure, i.e. the leaves of which overlap in a tightly packed arrangement.

A machine for trimming lettuces is already known (patent specification FR 89 12 414), i.e. for removing the peripheral leaves to collect the lettuce head in readiness for packaging in the shredded state to make up bags of prepared salads.

This process is perfectly suitable for all lettuces of the type in which the peripheral leaves to be removed are divergent.

Once the lettuce has been fixed on a support, the latter circulates the lettuce head in front of cutters which cut the leaves at their base so that they drop of their own accord without the need for manual intervention.

This known process and this known machine are not suitable for certain types of lettuce known as iceberg lettuce, which have tightly packed overlapping leaves.

In effect, even when the outer leaves have been cut at the base in a known manner, the fact that they overlap in a tightly packed arrangement means that they stay on the lettuce head, requiring manual intervention to remove them.

The objective of the present invention is to propose a method and an installation for preparing lettuce heads or other vegetables with overlapping and tightly packed leaves such as iceberg lettuces, to enable them to be shredded for ready-to-use salads.

To this end, the invention proposes a method, which is characterised in that the base of the sides of the outer leaves are severed from the head, the tip of the outer leaves is sliced off, the sides and the pieces of outer leaves thus cut are detached and the stalk is cut off so that the central edible part can be collected.

This double operation of severing and cutting off the leaves firstly at the base and then from their top or at their intermediate part or equatorial plane (which operation can be performed in any order and optionally simultaneously) strips the leaves from the peripheral layer and, depending on the case, enables them to become detached of their own accord or enables them to be readily detached simply by rubbing or by working them with fingers or similar members, or using a jet of air, which latches onto the peripheral leaves and detaches them from the central part of the lettuce head, leaving only the edible part.

The outer leaves of the peripheral layer are severed from the base in a substantially radial direction through the side or sides of the leaves. The cut at the tip of the leaves or in the middle or at the top of them is made in a substantially radial direction and not at a tangent. Even if it penetrates as far as the leaves of the edible part of the head underneath, this cut will not hamper subsequent operations due to the fact that the leaves of this type of lettuce or vegetable are so tightly packed and interleaved, and in particular will not cause the leaves of the edible part to drop off because the latter has not been severed from its base. In effect, there is a much bigger safety margin on a level with the base than there is on a level with the top of the lettuce due to the thickness of the ribs distributed around the stalk.

Cutting the top of the outer leaves enables shreds of leaves to be produced, which, even if they remain to a certain extent attached to one another, can be easily detached and in particular will open the shell formed by the overlapping leaves of the peripheral layer.

Advantageously, the lettuce head is rotated relative to the cutters when cutting the base of the outer leaves and the top of the peripheral leaves.

Having prepared the head in readiness for removing the peripheral, non-edible leaves from it, the stalk is cut and the head separated. The stalk remains attached to the support whilst the usable part of the head is detached.

Advantageously, the severed leaf shreds and the cut sides are detached by a mechanical means or, preferably, by blasting. The jet blast is advantageously directed onto the head to be prepared, close to the cutting members, so as to open up the leaf parts at the same time as they are cut.

This operation of removing the sides and leaf trimmings or shreds may also be effected after making the incisions and cuts.

If the sides of the lettuce heads have turned pink, it is of practical advantage firstly to remove the sides and outer leaves and then sever the stripped head so as to detach the main part, leaving only a heart around the stalk, and then sever these sides and detach them from the heart. The heart can then be prepared in the same way as the central edible part that was not cut in this way and the useful part of the heart is collected.

The useful parts of the head, either the whole of the useful part or the main part and the heart, are then cut to produce salad shreds.

The various operations of cutting and slicing the peripheral leaves and stalk are advantageously performed in a suspended position, the head being attached to and retained on a support, which holds it by the stalk during the different operations.

The invention also relates to an installation for implementing the process. This installation, designed specifically for preparing lettuce heads with tightly packed, overlapping leaves of the iceberg lettuce type or vegetables of a similar structure, has supports, each of which receives a lettuce head to be prepared and conveys it through the different work stations. This installation is characterised in that it comprises:

a station at which the base of the sides of the outer leaves is cut, fitted with a cutter in front of which the lettuce head mounted on the support passes, a station at which the top of the outer leaves is cut, fitted with a cutter for slicing into the top of the outer leaves, a removal station at which the cut leaves are removed, in front of which the head conveyed by the support passes, a stalk cutting station fitted with a cutter which slices the head around the stalk to detach the head from it and retain the stalk.

As a result of another feature, the installation has a device for providing a jet of air, in particular a blower, for removing the cut leaves.

By virtue of another feature, the installation has a transverse cutting or slicing station for cutting the head along a meridional plane or generally perpendicular to the axis of the lettuce head, this station being disposed downstream of the station at which the outer leaves are removed.

This installation enables lettuce heads to be processed on a totally automated basis, from the point of positioning to obtaining the head severed from its stalk, in readiness for shredding and packaging.

The cutters used to cut the base and the top of the peripheral leaves are preferably rotary discs, in front of which the lettuce heads are fed whilst being rotated about their axis.

By virtue of another feature, the station at which the stalk is cut is fitted with a cutter having a pointed blade. Once the lettuce head has arrived in the correct position conveyed by its support and the peripheral leaves have been removed, this cutter pierces the lettuce on a level with the stalk whilst the lettuce head effects a rotary motion, which separates the stalk and the lettuce head.

By virtue of another advantageous feature, the installation comprises
- a carousel
  - fitted with members distributed around the periphery for fixing the heads to be prepared,
  - rotating in front of work stations fitted with members for cutting and removing the sides and leaves,
- receptacles for
  - the waste to be discarded,
  - the good parts to be recovered.

Advantageously, the lettuce heads are conveyed in a position suspended from their support so that once the stalk has been cut off, the detached head drops and can be recovered and the stalk remains attached to the support so that it can be discarded.

The present invention will be described in more detail with reference to an example of an embodiment of the method and the installation, schematically illustrated in the appended drawings, of which:

FIG. 1 illustrates the different stages of the method proposed by the invention, FIG. 2 is a schematic diagram of an installation for preparing lettuce heads of the iceberg type, as proposed by the invention, FIG. 2a illustrates a variant of the cutter used to make an incision in the outer leaves.

As illustrated in FIG. 1, the invention relates to a method of preparing lettuce heads with tightly packed overlapping leaves. This type of lettuce, known as an iceberg lettuce due to its ability to withstand the cold, is a very resistant variety of lettuce and is widely used in numerous countries.

A lettuce head TS of this type is made up of a main part A attached to a stalk T, which terminates at the end of the rounded part of part A with a tail Q.

The main part is in the shape of a ball surrounded by outer leaves FE attached to the tail Q or stalk T by sides C.

The outer leaves FE, like the other leaves, wrap in an overlapping arrangement in one or more layers.

The outer leaves FE protect the main part A. They are not actually fit for consumption themselves and must be removed, leaving only the central part B, which is the edible part of the lettuce.

This process of preparing the edible part (B) of the lettuce will be described below, broken down into different operations.

During a first operation (I), the lettuce head TS is fixed on a support 1 by a fixing means, not illustrated in detail, but which very schematically consists of claws 2 which are inserted in the tail Q. The head is thus attached to the support 1 ready to be conveyed through different workstations and, depending on the situation, being rotated about its own axis.

In the different parts of FIG. 1, the lettuce head TS is illustrated in a position suspended from the support 1. This position need not necessarily be vertical. It may be outwardly inclined, depending on how the support 1 operates within the installation. However, it is useful for the head TS to be disposed below the support 1 in a vertical position or inclined to a greater or lesser degree, to enable the different parts to drop off.

Once the head TS has been positioned on the support 1, the sides C of the outer leaves FE are severed during a second operation (II) by a circular cutter which slices through the sides at their base, close to the tail Q. This circular cut relative to the axis ZZ of the head TS is obtained as a result of a relative rotary displacement between a cutter 3 and the head TS. During this relative rotary displacement, the head TS is advantageously rotated in front of the cutter 3.

Having sliced into the base of the sides C, the bottom of the outer leaves is cut away along one or more circular lines by making incisions I1, I2 (III). These incisions may be made close to the tip of the outer leaves or along an equatorial plane with a cutter 5, making incisions I1 or I2.

If the incision is close to the tip of the lettuce, it is also possible to make a radial incision along several lines rather than a peripheral incision like incision I2.

Having made an incision in the outer leaves and cut the base of the sides, the head TS is exposed to a jet of compressed air 6 directed on a level with one or the other of the incisions, at the base of the sides or along the incision I2 at the equatorial plane or the incision I1 close to the head, to blow away the leaf trimmings and the sides F', C and detach them from the part B. This action of the jet 6 preferably takes place in conjunction with the rotation of the head TS about its axis.

The three operations (II); (III); (IV) illustrated in succession here may also be combined in a single operation, in which case the cut made with the cutter 3 in the sides C, the incision made with the cutter 4 at the tip of the head or with the cutter 5 in the equatorial plane and the jet action 6 all take place simultaneously; the nozzle emitting the jet of compressed air 6 is juxtaposed with the cutter 4 or the cutter 5 for example, so as to detach the trimmings F' of outer leaves and sides C progressively as and when the incision or incisions are made.

After this step (IV), the central part B of the lettuce head remains attached to the support 1.

In the majority of cases, this central part may be used as it is and to this end, during a final step (V), the head is severed by means of a cutter 7 which makes an incision along the stalk T to separate the latter from the central part B, which is detached from the stalk, and at the end of this operation the stalk T is evacuated by opening the claws 2 of the support 1.

If the part B obtained at the end of operation (IV) when the outer leaves are removed can not be used as it is because the sides of the second layer of leaves have turned pink, an intermediate operation corresponding to step (IV bis) must be performed.

To this end, a cut is made in the central part B with a cutter 8 to detach the central part B1 leaving only the heart B2 surrounding the stalk attached to the support 1 and corresponding to the base of the sides C' of the new layer of outer leaves. These sides C' will be severed by means of a cutter 9 in a new step, in the same way as the sides C were, whilst effecting a relative rotation between the heart B2 and the cutter or cutters 9. The sides C are detached, leaving the heart B2.

This heart B2 will then be detached from its stalk T in the same way as part B directly leaving step IV. The same cutter 7 is used for these two similar operations.

Basically, at the end of this operation (V), instead of recovering part B, only the heart B2 is collected, the main part B1 having already been collected during step (IV bis).

The process of detaching the pink sides C' performed at step (IV bis) is controlled on the basis of a global decision depending on the batch of lettuce heads TS. In practice, the sides C' inside in the second layer of leaves do not turn pink individually. This phenomenon is attributable to growing and storage problems and is not something which occurs in isolation from time to time but is a phenomenon which will affect a whole batch. Under these conditions, before preparing a batch of lettuce heads, a decision will be taken as to which processes will be applied to the batch, either removing only the outer leaves of the first layer or removing the leaves of the first layer and those of the second layer to finish with a heart.

FIG. 2 illustrates one approach to operating an installation for implementing the method described above. The installation consists of a carousel 100, the periphery of which is fitted with supports 101 provided with a pin and fixing means in the form of claws 102 which are mechanically opened and closed.

A lettuce head is mounted simply by manually piercing the head on a pin, not illustrated, joined to the support; at this instant, the claws 102 are open. Once the carousel leaves the loading station 110, the claws 102 close around the tail of the lettuce head, holding it firmly in readiness for the subsequent operations. The claws will not open again to release the stalk severed from the lettuce head until the end of the process.

In this example, the carousel 100 has eight sets of equipment, each comprising a support 101 and claws 102. The carousel feeds the sets of equipment mounted with a lettuce head successively by rotation (arrow R), in steps or continuously, through the different work stations 110–117 where the operations involved in preparing the lettuce head are carried out.

The supports 101 are driven in rotation about their axis ZZ, either systematically during the entire rotation of the carousel or at only those stations where a relative rotation is required (arrow S). This rotation is operated by means of a pinion mounted on the support 101 and meshing with a ring gear or by a co-operating drive at each station, producing a given rotation depending on the operation to be performed. These different mechanical means will not be described in detail.

Similarly, the equipment at the station can be placed in idle mode, depending on the sequence of operations to be performed on the lettuce heads.

The entire installation is controlled from a control panel 130, which in particular enables settings to be entered for the operations to be performed.

The supports 101 are mounted on the carousel 100 with their axis ZZ disposed vertically or preferably downwardly inclined so that the lettuce heads TS are attached in a suspended position. This simplifies the operations and in particular enables the shreds and trimmings of cut sides as well as the edible parts B, B1, B2 to be simply detached so that they drop into receptacles or onto conveyor belts to be evacuated.

Stations 110–117 will be described in more detail below.

The supply station 110 enables the lettuce heads TS to be placed on the support 101. The lettuces are supplied in baskets or fed by a conveyor 120. An operator places them one by one on the support 101, which is preferably automatically operated; the claws 102 close around the tail of the lettuce head TS as soon as the tail is pushed against the support 101. The claws 102 are disposed so that the lettuce head is not at risk of becoming detached as it is driven in rotation by the support, under the influence of external actions and in particular the cutters.

The second station 111 is in idle mode in the installation illustrated here. It may receive any of the tools that are grouped in one of the other downstream stations illustrated, such as station 112.

Station 112 is where the outer leaves FE are severed at their base, close to the tail of the lettuce head, by means of a cutter 103. Another cutter 104 makes the incision I1 in the outer leaves close to the tip of the lettuce head and/or an incision I2 is made at the centre of the outer leaves, substantially in an equatorial plane, with a cutter 105. The cutters 103, 104, 105 are preferably fixed. For example, they are rotary discs, in front of which each head TS is driven by its support 101.

In another variant, a single cutter is used to perform the function of these three cutters 103, 104, 105 and successively takes the place of these cutters 103, 104, 105. In general, it is sufficient to make only one of the two incisions I1, I2 and the two are not necessary simultaneously.

In another variant (FIG. 2a), the cutter 104a for severing or slicing the outer leaves is U-shaped and slices the outer leaves in a "diametral", plane passing through the "axis" of the head (double arrow C). The cutting edge of the blade is indicated by an inclined line piercing the contour of the head 105. The mechanism operating the cutter 104a is not illustrated. It may be a pneumatic mechanism, for example.

Station 112 is also equipped with a device 106 for detaching the cut sides and shreds of outer leaves. This member 106 is one or several elastic fingers, against which the outer leaves rub as the head is rotated once the incision has been made. However, this device 106 is preferably a blower delivering a jet of air. This blower 106 is illustrated on the right-hand side, separately from the cutters 103, 105, in FIG. 2, merely for reasons of space, and is preferably positioned directly to the side of one of the cutters to assist the task of the cutter in opening the wrapping formed by the outer leaves and thus lifting the cut leaves as and when the incision is made in order to detach them. The detached pieces drop into a receptacle 131.

As illustrated, the cutter 103 may be installed at station 111 for making the cuts in the sides whilst the outer leaves FE are removed along the incision I1 or I2 at station 112, in which case the entire layer of outer leaves, cut sides included, is detached at station 112.

Station 113 makes the cut in part B stripped of the outer leaves, with the aid of a cutter 108, to leave behind the main part B1. The main part B1 is collected in a receptacle 132 whilst part B2 or the heart, with the tail attached, remains attached to its support. This station is not used unless the sides of the lettuce head TS have turned pink.

Station 114 follows 113 through which the lettuce heads pass if it is necessary to remove the pink sides. Station 114 has a cutter 109 which cuts the pink sides close to their base. As part B2 is removed, the cut sides C' are easily detached from the part B2 (heart) fixed by the tail. This heart remains attached to the support 101.

Part B2 of the head rotates in front of the cutter 109. The cut sides C' drop into a receptacle 133.

Station 115 receives either the whole central part B that has passed through stations 113, 114 in idle mode, or part B2 with the pink sides removed. Station 115 has a cutter with a pointed blade and a mechanism which plunges it into the base of part B or B2 as the latter rotates, to detach this part B or B2 from the stalk T. Part B or B2 then drops into the receptacle 134 whilst the stalk remains attached to the claws 102 of the support 101.

At station 116, the stalk T is evacuated by a command prompting the claws 102 of the support 101 to open. The stalk drops into the receptacle 135.

Station 117 is free. As mentioned above, it may be used if the tools of the other stations upstream are arranged in a different layout.

The collected parts B, B1, B2 constitute the useful parts of the lettuce head. They are then shredded in an installation, not illustrated (evacuation as indicated by arrow X).

As mentioned above, the carousel 100 rotates continuously and is sufficiently slow for the manual loading operation to be effected at station 110, whilst the various cutting operations performed at stations 112, 113, 114, 115 take place as the carousel 100 rotates, the supports 101 with the lettuce heads also being rotated if necessary as they pass in front of the cutters 103–109.

What is claimed is:

1. An apparatus for preparing lettuce heads having tightly packed and overlapping leaves, said lettuce heads each having a stalk, a base, a central part, outer leaves, each such outer leaf having a base, a tip, and a heart, said heart including pink parts, said apparatus comprising:
   a plurality of workstations;
   a support for receiving a lettuce head and for conveying said lettuce head through said workstations;
   a first cutter operably disposed at one said station for severing the bases of the outer leaves;
   a second cutter operably disposed at one said station for slicing into the tops of the outer leaves;
   means for removing the outer leaves with severed bases and sliced tops, said means for removing operably disposed at one said stations;
   a third cutter disposed at one said stations for transversely slicing the central part and thereby severing a portion of said central part from the heart;
   a fourth cutter disposed at one said stations for severing the pink parts from the heart; and
   a fifth cutter for severing the heart from the stalk.

2. The apparatus of claim 1 wherein said means for removing comprising an air jet device.

3. The apparatus of claim 1 wherein said first, second, and fifth cutters are rotary disks.

4. The apparatus of claim 1 wherein said first, second, third, fourth and fifth cutters are disposed in fixed positions at said work stations and said support with a supported lettuce head rotates in front of said cutters.

5. The apparatus of claim 1 wherein said fifth cutter has a pointed blade for piercing a heart around a stalk, and a rotary drive means disposed at said station wherein said fifth cutter is disposed, thereby causing the head to rotate relative to said fifth cutter.

6. The apparatus of claim 1 further comprising a carousel, said carousel having a periphery, said plurality of stations disposed around said periphery; and a plurality of receptacles disposed around said periphery for respectively receiving outer leaves, said stalk, said central heart portion, said pink parts, and said heart.

7. The apparatus of claim 1 wherein said first cutter is a U-shaped cutter.

* * * * *